Figure 1:
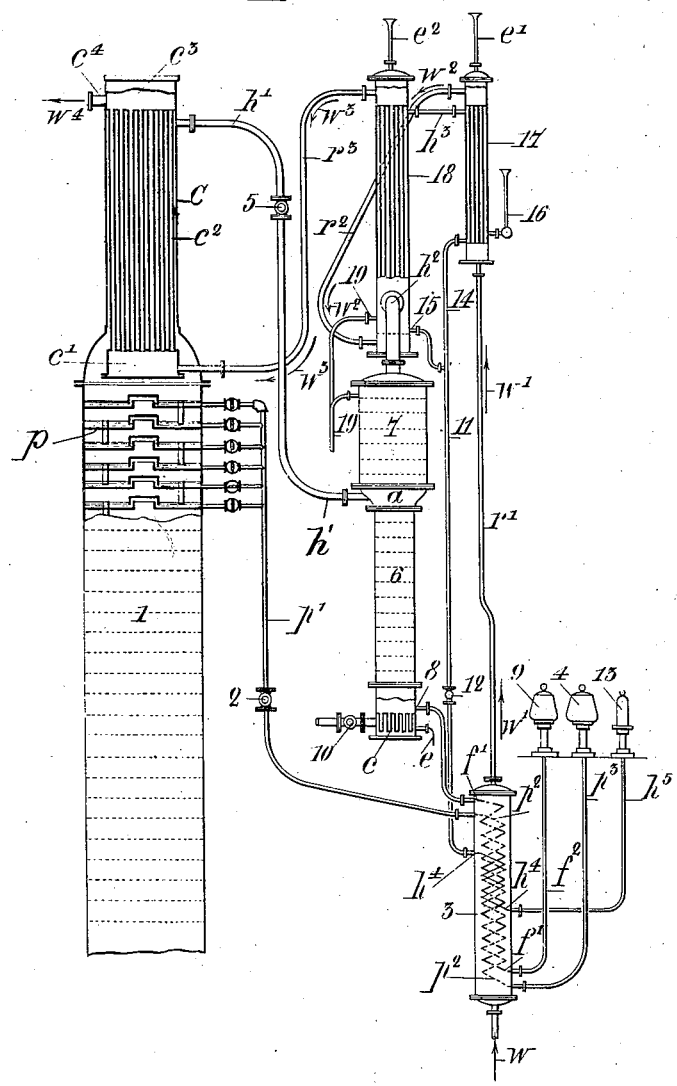

E. GUILLAUME.
PROCESS FOR THE PURIFICATION OF ALCOHOL AND SIMILAR LIQUIDS.
APPLICATION FILED APR. 11, 1907.

992,498.

Patented May 16, 1911.

3 SHEETS—SHEET 3.

WITNESSES:

INVENTOR,
EMILE GUILLAUME,
by
Attorney

UNITED STATES PATENT OFFICE.

EMILE GUILLAUME, OF BLIDA, ALGERIA.

PROCESS FOR THE PURIFICATION OF ALCOHOL AND SIMILAR LIQUIDS.

992,498.   Specification of Letters Patent.   Patented May 16, 1911.

Application filed April 11, 1907. Serial No. 367,697.

*To all whom it may concern:*

Be it known that I, EMILE GUILLAUME, a citizen of France, residing at Avenue de la Gare, Blida, Algeria, have invented new and useful Improvements in Processes for the Purification of Alcohol and Similar Liquids, (for which I have obtained a patent in France, No. 365,417, bearing date of April 19, 1906, and Canada, No. 102,111, November 20, 1906,) of which the following is a specification.

My invention relates to a new and improved process for the purification of alcohol and similar liquids.

It relates particularly to a continuous process for removing in one operation and in one combined apparatus the impurities mixed with the alcohol under the name of "head" and "tail" products, whereby there is obtained, as the final product, a pure alcohol of very high degree, 99%, the other 1% being water and slight traces of other impurities.

It relates, further, to a process in which there are obtained in one operation two grades of alcohol, the one having a high quality suitable for many technical purposes, and the other, an alcohol of the highest attainable purity. The first grade amounting, for example, to about one-half the total quantity obtained, is drawn off from one of the upper shelves of the rectifying column in the form of ethyl alcohol practically free from head products, but containing a small quantity of the most volatile tail products. The second portion passing from the top of the dephlegmator, or condenser, into the purifying apparatus, consists of ethyl alcohol carrying head products. It is from this second portion that the ethyl alcohol, free from head products, is obtained almost absolutely pure.

By "head" products are meant those impurities having a lower boiling point than ethyl alcohol: by "tail" products, those impurities whose boiling point is higher than ethyl alcohol. Under head products may be included the aldehydes, ethers, and the like, while the tail products include such impurities as amyl alcohol, isoamyl acetate, isovalerate of ethyl, etc.

My process is not limited to any specific apparatus, and that shown in the drawing is only by way of example.

Figure 2:
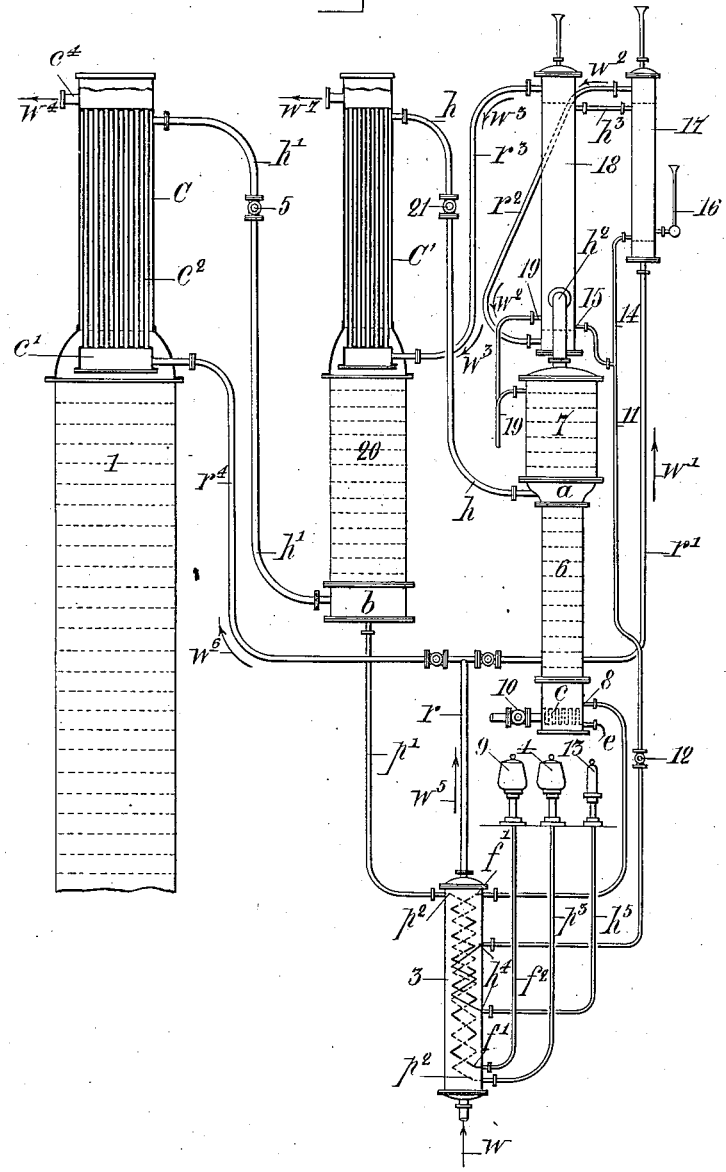

In the drawings:—Figure 1 shows a simple form of apparatus, but one in which my process in its entirety can be carried out: Fig. 2 is an approved form, and Fig. 3, another modification which gives the best results.

I have chosen as an example a rectifying column capable, when of proper dimensions, of producing, per 24 hours, 2500 hectoliters of alcohol including the water combined therewith. Such a column would contain approximately 45 to 50 plates, would have a diameter of 1.6 meters and be about 7.5 meters high.

Referring to the drawings, particularly to Fig. 1, 1 is a rectifying column carrying a series of perforated plates, such as are found in any ordinary rectifying column; C the condenser, or dephlegmator, topping rectifying column 1, and connected by the pipe $h'$, controlled by the cock 5, with the two-part purification column 6—7. From one of the upper shelves, here shown as the fifth from the top, a pipe $p'$, controlled by cock 2, leads to the coil $p^2$ of the refrigerator 3, and thence to the testing apparatus 4. From the base of the column 6—7 a pipe 8 leads through the coil $f'$, of refrigerator 3, into the pipe $f^2$ and the tester 9. Above the column 6—7 is located a condenser 18, connected therewith by the pipe $h^2$.

17 is a supplementary condenser, or refrigerator, connected to the condenser 18 by the pipe $h^3$, and to the refrigerator 3 by the pipe 11 controlled by the cock 12.

Figure 3:
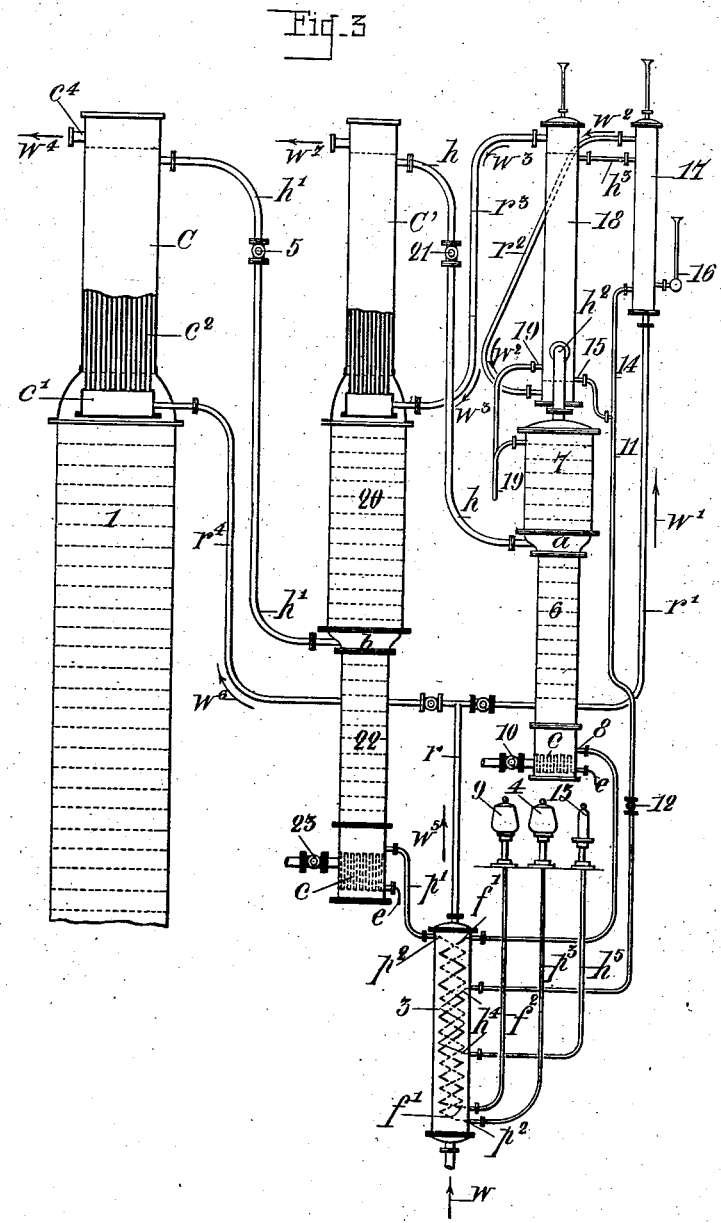

Water for cooling the condensers enters the refrigerator 3 by the pipe W, and follows the course of the pipes $W'$, refrigerator 17, pipe $W^2$, refrigerator 18, pipe $W^3$, condenser C and pipe $W^4$. In Figs. 2 and 3, the water follows the pipes W to $W^7$.

To operate my process, I proceed as follows, referring first to Fig. 1. Into the rectifying column 1 at the bottom, I introduce as raw material, an alcoholic product which has preferably been previously distilled to raise its percentage of alcohol to 50%, for example. I raise the temperature of the product during treatment in the rectifying column above the boiling point of ethyl alcohol, say to 80° C. The vapors, composed of ethyl alcohol, head products, and the most volatile of the tail products, rise through the rectifying column 1 into the condenser C, where, in order to strengthen them, they are cooled off and partially condensed. From the condenser the condensed vapors, at a temperature of 75–80° C., flow down on to the plates of the rectifier, and in flowing down meet an ascending current of weak alcoholic vapors; the products are thereby brought to ebullition and evaporation and become richer in alcohol. These are condensed and deposited on the shelves $p$, and by frequent repetition of this operation a very strong alcohol is finally obtained. The liquid condensed on the upper shelves of the rectifying column is composed of 97% to 98% ethyl alcohol, water and the most volatile of the tail products, with small traces of the head products (1–200000th *circa*), composed of the aldehydes and light ethers. The tail products, carried by the alcoholic liquor on the shelves, are traces of amyl alcohol and several of the most volatile of the tail products, such as, for example, the isobutyrate of ethyl. From one of the upper shelves of the restifying column, at a point where the alcohol is nearly free from the tail products, I draw off the alcohol deposited thereon. I have shown the drawing off as taking place at the fifth plate from the top, though the choice would be determined by the quality of the liquid desired. In practice, tap cocks, connecting the pipe $p'$ with several of the upper plates would be employed. From the shelf chosen, the liquid flows through the pipe $p'$, controlled by the cock 2, through the refrigerator 3, to the tester 4 and to the proper storage receptacles.

The operator tests the quality of the alcohol in 4 by either taste, smell, or chemical analysis. Smell is the test most readily employed, and the aldehydes and the ether being very pungent, they will make known the presence of head products. If the operator detects any considerable quantity of head products in the tester 4, he will know that he is drawing off the liquor too rapidly from the shelves, and will close more or less the valve 2, or else he will increase the heat in the rectifying column.

The second portion of the vapors, not condensed on the shelves $p$, and consisting of ethyl alcohol and head products, in the proportion of *circa* 99% alcohol and *circa* 1% aldehyde and ether, with a possible infinitesimal amount of tail products, passes from the top of the condenser C through the pipe $h'$ into the middle portion $a$ of the purification column 6–7. Here the ethyl alcohol is condensed on the plates of the column 6, and is drawn off as almost absolute alcohol by the pipe 8 through the refrigerator to the tester 9, and thence to storage. The head products pass upward through the column 7, pipe $h^2$, condenser 18, pipe $h^3$ to refrigerator 17, whence the condensed products pass by pipe 14, to the refrigerator, and to the tester 13. Should the temperature in column 6–7 become too low, (that is, below 75°–78° C., and traces of the head products show themselves in the tester 9, the heat applied at the base of column 6, in a closed coil, is increased by means of additional steam through 10, $c$ and $e$, which causes a revaporization and driving off of the contained head products. The columns 6—7 are formed like column 1, the action of the shelves being the same in each.

I have thus carried out my process, obtaining one grade of alcohol from the shelves, and an almost anhydrous alcohol from the base of column 6—7.

The condensers 18 and 17 are provided at their tops with pipes $e'$ and $e^a$ to allow the pressure therein to remain approximately equal to that of the atmosphere. The finally condensed head products from the condensers 18 and 17 pass by the pipes 15 and 14 through the pipe 11 into the refrigerator and tester 13.

The modification shown in Fig. 2 differs only slightly from the apparatus in Fig. 1, but gives better results. In this I do not draw off the first portion of the alcohol (that is to say the portion containing the most volatile tail products and ethyl alcohol) from the upper plates of the rectifying column, but I arrange between the condenser of the said column and the column of final purification, an intermediate column, into which I send the alcoholic vapors leaving the top of the condenser of the rectifying column, and from the bottom of the said intermediate column, I draw off an alcohol corresponding to that drawn off from the shelves of the rectifying column in Fig. 1, but of a higher quality. In this modification the heated alcoholic vapors are compelled to rise over the shelves of rectifying column 1, into the condenser C, some being condensed and flowing back again into column 1, as in Fig. 1. The vapor passing out of condenser C through the pipe $h'$, controlled by valve 5 contains the most volatile tail products, which have not been left on the shelves of column 1 and in the condenser C, together with ethyl alcohol and head products. These vapors pass into the base $b$ of the column 20—C' (similar in construction to 1—C of Fig. 1) and ascend through the analyzer (reflux condenser) 20 into the condenser C'. In their passage over the plates in 20 and in the condenser C', a portion of the ethyl alcohol and the tail products become condensed and fall to the base $b$, whence by the pipe $p'$ they are drawn, through the coil $p^2$ of the condenser 3, to pipe $p^3$, tester 4, and storage receptacles. Since the ethyl alcohol in this case has traveled farther in the rectifying column 1, and condenser C than did that drawn off from the plates of Fig. 1, it is necessarily freer from tail products and purer. The uncondensed ethyl alcohol and the head products leaving the top of condenser C' by the pipe $h$, pass to the final purification column 6—7, thence to the condensers 18—17 and the refrigerator 3, as in Fig. 1, the purified alcohol being drawn off through pipe 8 to the refrigerator and the storage receptacles.

In the modification shown in Fig. 3, the ethyl alcohol carrying head products, with the most volatile tail products, passes off at the top of condenser C, through the pipe $h'$ to the portion $b$ of the purifying column 22—20, constructed and operating the same as column 6—7, of Fig. 1, the purified ethyl alcohol, corresponding to that drawn off from the shelves of 1, Fig. 1, being led from the base of column 22, through the refrigerator coil to the tester 4 and storage receptacles. This ethyl alcohol is evidently still purer than that drawn off from the base of column 20, Fig. 2, since it has been subjected to the purifying action of the double column 22—20, instead of the single column 20. The ethyl alcohol and head products that are uncondensed pass from column 20—22 to the column of final purification 6—7 where the ethyl alcohol parts with practically all traces of head products, and is drawn off as absolutely pure ethyl alcohol from the base of column 6, by the pipe 8, to the refrigerator, the tester 9, and storage receptacles. What uncondensed head products enter the condensers 18 and 17, become condensed therein and pass from 17 to the tester 13, this part of the operation being the same in all the figures.

The cocks 5 in Figs. 1, 2, 3, and 21 in Fig. 3 control the amount of head products passing over with the ethyl alcohol, since if the operator detects the odor of head products in the final products, he closes the cocks and subjects the vapors passing from the condensers to more intense treatment before they leave the same.

Having thus fully illustrated and described my invention, what I claim is:—

1. The process of rectifying and purifying previously distilled alcohol, which consists in subjecting the same in a rectifying column to heat sufficient to cause it to vaporize and a predetermined portion thereof to become condensed, in the form of ethyl alcohol with trace of tail products, upon the upper shelves of the rectifier, drawing off to the refrigerating device the alcohol thus collected, passing the remaining portion of the products of the rectifier issuing from the top of the rectifying column in the form of ethyl alcohol and head products through a final purification device, separating therein the ethyl alcohol from the head products and drawing off the alcohol in the form of almost absolutely pure ethyl alcohol, and then condensing and drawing off the head products, substantially as described.

2. The process of rectifying and purifying alcohol, which consists in subjecting the same to heat sufficient to cause it to vaporize and rise in the rectifying column and become condensed on the upper shelves thereof in the form of ethyl alcohol carrying traces of tail products, controlling the rectification in such a manner that practically half of the products of the column are drawn off from the upper shelves, passing the remaining half of the rectifier products as ethyl alcohol and head products to a final purification device, condensing therein the alcoholic vapor and separating the alcohol from the head products, drawing off the alcohol in the form of almost absolutely pure ethyl alcohol, and separately condensing and collecting the head products, substantially as set forth.

3. The process of rectifying and purifying previously distilled alcohol, which consists in subjecting the same in a rectifying column to heat sufficient to cause it to vaporize and pass out of the top of the condenser in the form of ethyl alcohol, head products and a trace of tail products, leading these vapors into the bottom of an intermediate column, condensing therein a certain part of the alcohol vapors, drawing off the condensate to the refrigerator in the form of a very pure ethyl alcohol containing only traces of tail products, passing the uncondensed ethyl alcohol and head products to the column of final purification, and therein separately condensing the head products and the ethyl alcohol, and drawing off the alcohol in the form of almost absolutely pure ethyl alcohol substantially as set forth.

4. The process of rectifying and purifying previously distilled alcohol, which consists in subjecting the same in a rectifying column to heat sufficient to cause it to vaporize and pass out of the top of the condenser in the form of ethyl alcohol, head products and a trace of tail products, leading these vapors into an intermediate column, condensing therein a certain part of the alcohol vapors, drawing off the condensate to the refrigerator in the form of a very pure ethyl alcohol containing only traces of tail products, passing the uncondensed ethyl alcohol and head products to the column of final purification, and therein separately condensing the head products and the ethyl alcohol, and drawing off the alcohol in the form of almost absolutely pure ethyl alcohol, substantially as set forth.

5. The process of rectifying and purifying alcohol, which consists in subjecting the same in a rectifying column to heat sufficient to cause it to vaporize and pass out of the top of the condenser in the form of ethyl alcohol, head products and a trace of tail products, leading these vapors into the bottom of an intermediate column, condensing therein a certain part of the alcohol vapors, drawing off the condensate to the refrigerator in the form of a very pure ethyl alcohol containing only traces of tail products, passing the uncondensed ethyl alcohol and head products to the column of final purification, and therein separately condensing the head products and the ethyl alcohol, and drawing off the alcohol as almost absolutely pure ethyl alcohol, substantially as set forth.

In testimony whereof I have signed my name to this specification in the presence of two subscribing witnesses.

EMILE GUILLAUME.

Witnesses:
 JULES FAYOLLET,
 EUGÈNE PICHON.